United States Patent
Kondo et al.

(10) Patent No.: US 7,239,745 B2
(45) Date of Patent: Jul. 3, 2007

(54) COLOR-CONVERTING APPARATUS

(75) Inventors: Masaki Kondo, Toyoake (JP);
Yasunari Yoshida, Ama-gun (JP);
Masashi Ueda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 685 days.

(21) Appl. No.: 10/671,695

(22) Filed: Sep. 29, 2003

(65) Prior Publication Data

US 2004/0062436 A1 Apr. 1, 2004

(30) Foreign Application Priority Data

Sep. 30, 2002 (JP) .............................. 2002-286222

(51) Int. Cl.
*G06K 9/00* (2006.01)

(52) U.S. Cl. ...................... 382/167; 382/162; 382/164; 382/166

(58) Field of Classification Search ................ 382/167, 382/162, 164, 166; 358/2.99, 518, 1.1, 1.2, 358/505, 502
See application file for complete search history.

(56) References Cited

U.S. PATENT DOCUMENTS

| 5,835,624 | A | 11/1998 | Ueda et al. ................. 382/162 |
| 6,323,959 | B1 * | 11/2001 | Toyama et al. ............. 382/312 |
| 6,411,318 | B1 | 6/2002 | Sawano et al. ............. 347/188 |
| 6,417,932 | B1 * | 7/2002 | Hirota et al. ................ 358/1.2 |
| 6,631,207 | B2 * | 10/2003 | Hirota et al. ............... 382/167 |
| 7,079,685 | B1 * | 7/2006 | Hirota et al. ............... 382/167 |

FOREIGN PATENT DOCUMENTS

| JP | A 9-116776 | 5/1997 |
| JP | A 11-55534 | 2/1999 |
| JP | A-2002-94826 | 3/2002 |

* cited by examiner

*Primary Examiner*—Anh Hong Do
(74) *Attorney, Agent, or Firm*—Oliff & Berridge, PLC (57) ABSTRACT

Input image data (255, 100, 50) is first converted into output image data (240, 110, 40) based on the color conversion properties of the input end device and the output device, and is subsequently converted into final output image data (255, 115, 40). The latter conversion satisfies the relationship of (240−40):(110−40)=(255−40):(115−40). By changing the highest-gradation-level color in the output image data into the maximum gradation value (255), the complementary color component is made zero in the output results of the output device, thereby reducing granularity Since the middle-gradation-level color is corrected, variations in color hue are reduced.

16 Claims, 7 Drawing Sheets

| Rm | Gm | Bm |
|----|----|----|
| 255 | 100 | 50 |

FIG.2(b)
S109

| Rp | Gp | Bp |
|----|----|----|
| 240 | 110 | 40 |

FIG.2(c)
S113

| Ro | Go | Bo |
|----|----|----|
| 255 | 110 | 40 |

FIG.2(d)

a* b* MAP

a* b* MAP

COLOR-CONVERTING APPARATUS

BACKGROUND OF THE INVENTION

1. Field of the Invention

The present invention relates to a color-converting method and apparatus for matching colors on two differing devices.

2. Description of Related Art

Color conversion such as that described in U.S. Pat. No. 5,835,624 is performed when attempting to match colors produced on two differing devices.

SUMMARY OF THE INVENTION

However, when performing color conversion to obtain on the output side the same colors as full colors such as RGBCMY on the input side, for example, a slight amount of other color materials are mixed with the outputted colors because the primary color materials or the color mixing methods themselves vary according to device. Granularity can occur when a slight amount of color material becomes haphazardly mixed in this way into the output image. In particular, full colors are often used to produce uniform solid regions. Accordingly, granularity stands out more than the color matching and is recognized as deterioration in image quality.

U.S. Pat. No. 6,411,318 has proposed one color-converting method for overcoming this problem. In this method, when at least one color of a coloring material has a 0% density before conversion, then this color keeps the 0% color density after conversion.

Figure 1:
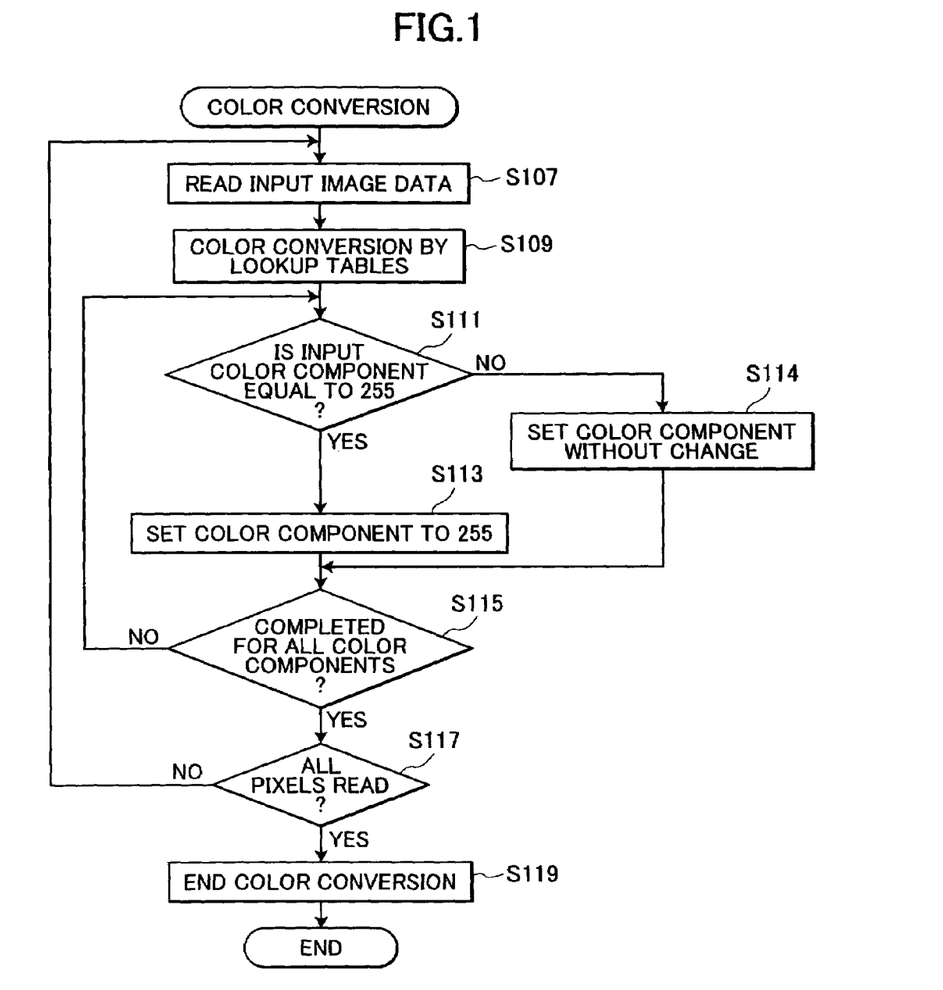
FIG. 1 is a flow chart showing a conceivable color converting process.

Next will be described with reference to FIG. 1 a conceivable color-converting method for overcoming this problem.

The conceivable color-converting method is for converting input image data for a monitor (input end device) into output image data for a printer (output end device) and for correcting the output image data.

The input image data indicates an input image that is configured of pixels arranged in a two-dimensional layout. Each pixel is configured of three color components defined as a red component Rm, a green component Gm, and a blue component Bm. Input image data for each pixel is therefore defined as a set of data (Rm, Gm, Bm) and functions as color data for controlling the monitor.

The color component Rm has 256 gradations defined along an axis of the red primary color and represented in eight bits as 0 (predetermined minimum value)–255 (predetermined maximum value MAXm). As the gradation level increases from 0 to 255 along the red-color-axis, the lightness increases. Thus, 0 is the darkest level along the red-color-axis and 255 is the lightest or brightest level along the red-color-axis. Hence, Rm of 255 indicates the brightest level on the monitor for red primary color.

The color component Gm has 256 gradations defined along an axis of the green primary color and represented in eight bits as 0 (predetermined minimum value)–255 (predetermined maximum value MAXm). As the gradation level increases from 0 to 255 along the green-color-axis, the lightness increases Thus, 0 is the darkest level along the green-color-axis and 255 is the lightest or brightest level along the green-color-axis. Hence, Gm of 255 indicates the brightest level on the monitor for green primary color.

The color component Bm has 256 gradations defined along an axis of the blue primary color and represented in eight bits as 0 (predetermined minimum value)–255 (predetermined maximum value MAXm). As the gradation level is increases from 0 to 255 along the blue-color-axis, the lightness increases. Thus, 0 is the darkest level along the blue-color-axis and 255 is the lightest or brightest level along the blue-color-axis. Hence, Bm of 255 indicates the brightest level on the monitor for blue primary color.

As with the input image data (Rm, Gm, Bm), the output image data indicates an output image that is also configured of pixels arranged in a two-dimensional layout, with each pixel configured of the three color components red, green, and blue defined by (Rp, Gp, Bp). The output image data (Rp, Gp, Bp) functions as color data for controlling the printer.

The color component Rp has 256 gradations defined along an axis of the red primary color and represented in eight bits as 0 (predetermined minimum value)–255 (predetermined maximum value MAXm). As the gradation level increases from 0 to 255 along the red-color-axis, the lightness increases. Thus, 0 is the darkest level along the red-color-axis and 255 is the lightest or brightest level along the red-color-axis. Hence, Rp of 255 indicates the brightest level on the printer for red primary color.

The color component Gp has 256 gradations defined along an axis of the green primary color and represented in eight bits as 0 (predetermined minimum value)–255 (predetermined maximum value MAXm). As the gradation level increases from 0 to 255 along the green-color-axis, the lightness increases. Thus, 0 is the darkest level along the green-color-axis and 255 is the lightest or brightest level along the green-color-axis. Hence, Gm of 255 indicates the brightest level on the printer for green primary color.

The color component Bp has 256 gradations defined along an axis of the blue primary color and represented in eight bits as 0 (predetermined minimum value)–255 (predetermined maximum value MAXm). As the gradation level increases from 0 to 255 along the blue-color-axis, the lightness increases. Thus, 0 is the darkest level along the blue-color-axis and 255 is the lightest or brightest level along the blue-color-axis. Hence, Bp of 255 indicates the. brightest level on the printer for blue primary color.

First, in S107, one set of input image data (Rm, Gm, Bm) for one pixel is inputted.

Next, in S109, a lookup table color conversion process is executed to convert the input image data set (Rm, Gm, Bm) into a set of output image data (Rp, Gp, Bp) using lookup tables LUTm and LUTp. The lookup table LUTm expresses a color-converting property of the monitor, while the lookup table LUTp expresses color-converting property of the printer.

In S111, one of the components in the input image data (Rm, Gm, Bm) is examined. It is determined whether the examined component in the input image data (Rm, Gm, Bm) is equal to the maximum gradation level Maxm (255), that is, the brightest level for the monitor.

If the examined component in the input image data (Rm, Gm, Bm) is equal to 255 (S111: YES), then in S113 one color component in the output image data (Rp, Gp, Bp) that has the closest relationship with the examined component in the input image data (Rm, Gm, Bm) is corrected into the maximum level MAX (255) for the printer, and the corrected value 255 is set as the corresponding color component in a set of final output image data (Ro, Go, Bo).

More specifically, the following conversions are performed in S113:

If (Rm=255), Ro=255.
If (Gm=255), Go=255.
If (Bm=255), Bo=255.

On the other hand, if the examined color component is determined to be different from the value Maxm (255) in S111 (S111: NO), then in S114 one color component in the output image data (Rp, Gp, Bp) that has the closest relationship with the examined component in the input image data (Rm, Gm, Bm) is set, without change, as a corresponding color component in a set of final output image data (Ro, Go, Bo).

More specifically, the following conversions are performed in S114:

If (Rm≠255), Ro=Rp.
If (Gm≠255), Go=Gp.
If (Bm≠255), Bo=Bp.

Next, the process proceeds to S115. In S115, it is determined whether the determination in S111 has been completed for all the three color components in the input image data (Rm, Gm, Bm) for the subject pixel.

If determinations have been completed for all the color components in the input image data (Rm, Gm, Bm) for the subject pixel (S115: YES), then in S117 it is determined whether color conversion has been completed for all the pixels in the input image data. If color conversion has been completed for all the pixels (S117: YES), then in S119 the color conversion process ends.

On the other hand, if it is determined in S115 that determinations have not yet been completed for all the three color components in the input image data (Rm, Gm, Em) for the subject pixel (S115: NO), then the process returns to S111 and the next color component of the same pixel is examined.

On the other hand, if it is determined in S117 that color conversion has not yet been completed for all the pixels in the input image data (S117: NO), then the process returns to S107 and executes color conversion on the next pixel.

Once the color conversion process is completed, the final output image data (Ro, Go, Bo) for all pixels is transferred to the printer, and the printer outputs the corresponding image.

More specifically, the printer determines a set of print data (C, M, Y) by calculating the following equations based on the final output image data (Ro, Go, Bo) for each pixel.

$C=255-Ro,$ $M=255-Go,$ and $Y=255-Bo.$

Using these equations, the printer determines gradation levels of cyan, magenta, and yellow, which are the complementary color components of red, green, and blue, respectively. The printer then forms an image by outputting cyan, magenta, and yellow color materials in amounts that are determined based on the print data (C, M, Y).

In this way, when some color component in a set of input image data (Rm, Gm, Bm) for some pixel has the maximum gradation value Maxm (255), the corresponding color component in the output image data (Rp, Gp, Bp) is corrected into a value indicating the maximum gradation MAX (255) for the printer and is set as a corresponding color component in the final output image data (Ro, Go, Bo). Accordingly, it is possible to prevent a complementary color component from being mixed with the color of the pixel, thereby preventing occurrence of the granularity in the color.

Next, the above-described conceivable color conversion process will be described using specific numerical values.

Figure 2A:
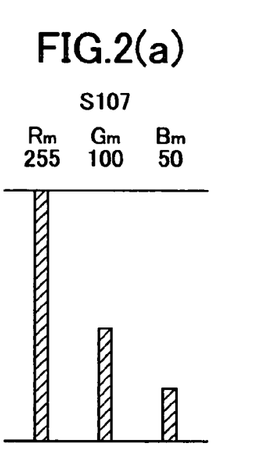
FIG. 2(a) is a graph showing the example of input image data (Rm, Gm, Bm)
Figure 2B:
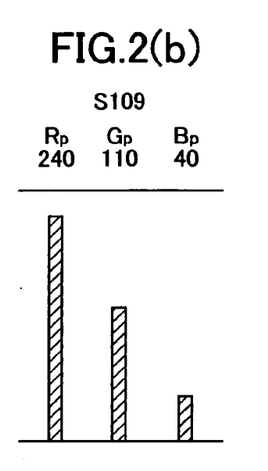
FIG. 2(b) is a graph showing an example of output image data (Rp, Gp, Bp)

Assume now that input image data (255, 100, 50) shown in FIG. 2(a) is inputted as a set of input image data (Rm, Gm, Bm) in S107, and that the color conversion process of S109 converts the input image data (255, 100, 50) into output image data (240, 110, 40), and sets the output image data (240, 110, 40) as output image data (Rp, Gp, Bp) as shown in FIG. 2(b).

In this example, the R component of the input image data (255, 100, 50) has the maximum level Maxm (255) on the input end, giving a determination of YES in S111.

Figure 2C:
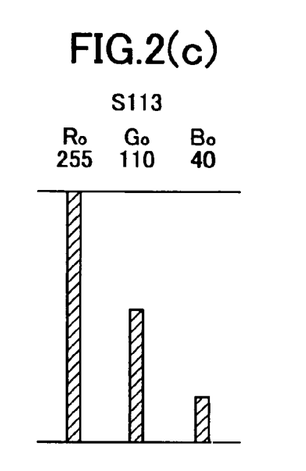
FIG. 2(c) is a graph showing an example of final output image data (Ro, Go, Bo)

The R component in the output image data (240, 110, 40) has the closest relationship to the R component of the input image data (255, 100, 50). Accordingly, in S113 the value 240 of the R component in the output image data (240, 110, 40) is replaced with the maximum gradation LPA (255) on the output end. In other words, the output image data (240, 110, 40) is corrected to (255, 110, 40), as shown in FIG. 2(c), and outputted as final output image data (Ro, Go, Bo).

Since the R component Rp of the output image data is originally 240, as shown in FIG. 2(b), the R component Rp should be reproduced using the complementary color component C with an amount of 15 (=255−240). However, since the R component Rp is corrected to Ro=255, as shown in FIG. 2(c), the complementary color is eliminated since the complementary color component now has a value of zero (=255−255). Accordingly, this process prevents the cyan component from becoming mixed with the red primary color.

Figure 2D:
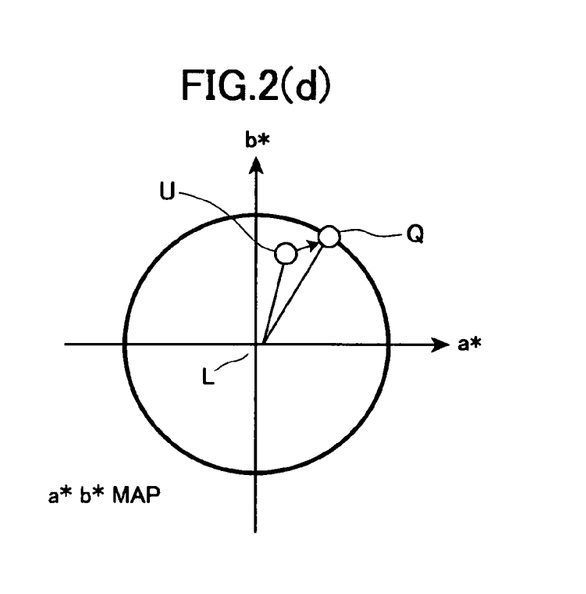
FIG. 2(d) is an explanatory diagram of an a*b* map showing the chroma and hue of a point U indicating the output image data of FIG. 2(b) and a point Q indicating the final output image data of FIG. 2(c)

FIG. 2(d) shows the a*b* two-dimensional coordinate system, which is a cross-section of the L*a*b* three-dimensional color space and which is normal to the L axis at a predetermined lightness L. The L axis extends perpendicularly with the sheet of the drawing. Chroma increases further away from the L axis. Different color hues are distributed in a circumferential direction around the L axis.

In FIG. 2(d), a point U indicates the output image data (240, 110, 40) in FIG. 2(b) that is obtained through the color conversion in S109. A point Q indicates the final output image data (255, 110, 40) in FIG. 2(c) that is obtained through the color correction of S113. The result of output from the printer, indicated by the point Q, has a greater red component than the result displayed on the monitor, indicated by the point U. Thus, the result of output from the printer has a greater chroma and therefore expresses a more vivid or stronger color than the result of output from the monitor, but has a hue that greatly deviates from the original hue on the monitor.

This same problem occurs also when the input device is not a monitor and the output device is not a printer. For example, the same problem arises when the input device is a color scanner and the output device a monitor.

In view of the foregoing, it is an object of the present invention to provide a color-converting apparatus and color-converting method capable of preventing the appearance of granularity in color images on an output device while reducing deviations in color hue.

In order to attain the above and other objects, the present invention provides a color-converting apparatus comprising: an inputting portion receiving input color data comprising input gradation levels for at least three input color components for an input end device; a color converting portion converting the input color data into output color data that comprises output gradation levels for at least three output color components for an output end device, the color converting portion executing the converting operation using conversion properties of the input end device and of the output end device; a determining portion determining whether one of the input gradation levels in the input color data is equal to a predetermined maximum input gradation level; and a correcting portion correcting the output color data into corrected output color data when the determining portion determines that one input gradation level in the input color data is equal to the predetermined maximum input gradation level, the corrected output color data comprising final output gradation levels for the at least three output color components, the correcting portion including: a maximum-gradation-level preserving portion correcting, into a predetermined maximum output gradation level, one output gradation level in the output color data for one output color component that corresponds to one input color component whose input gradation level is equal to the predetermined maximum input gradation level, thereby setting the predetermined maximum output gradation level as a final output gradation level for the subject output color component in the corrected output color data; an intermediate-gradation-level extracting portion extracting another output color component having an intermediate output gradation level that is intermediate among the output gradation levels in the output color data; and a hue preserving portion correcting the intermediate output gradation level based on correction characteristics of the maximum-gradation-level preserving portion, and setting the corrected intermediate output gradation level as a final output gradation level for the extracted output color component in the corrected output color data.

According to another aspect, the present invention provides a color-converting method comprising: receiving input color data comprising input gradation levels for at least three input color components for an input end device; converting the input color data into output color data that comprises output gradation levels for at least three output color components for an output end device, the color converting step executing the converting operation using conversion properties of the input end device and of the output end device; determining whether one of the input gradation levels in the input color data is equal to a predetermined maximum input gradation level; and correcting the output color data into corrected output color data when the determining step determines that one input gradation level in the input color data is equal to the predetermined maximum input gradation level, the corrected output color data comprising final output gradation levels for the at least three output color components, the correcting step including: preserving a maximum-gradation-state of the input color data by correcting, into a predetermined maximum output gradation level, one output gradation level in the output color data for one output color component that corresponds to one input color component whose input gradation level is equal to the predetermined maximum input gradation level, and by setting the predetermined maximum output gradation level as a final output gradation level for the subject output color component in the corrected output color data; extracting another output color component having an intermediate output gradation level that is intermediate among the output gradation levels in the output color data; and preserving hue of the input color data by correcting the intermediate output gradation level based on correction characteristics of the maximum-gradation-state preserving step and by setting the corrected intermediate output gradation level as a final output gradation level for the extracted output color component in the corrected output color data.

BRIEF DESCRIPTION OF THE DRAWINGS

The above and other objects, features and advantages of the invention will become more apparent from reading the following description of the preferred embodiments taken in connection with the accompanying drawings in which:

FIG. 2(a)–FIG. 2(d) are explanatory diagrams showing how an example of input image data set is converted by the conceivable color converting process of FIG. 1, wherein

FIG. 6(a)–FIG. 6(d) are explanatory diagrams showing how an example of input image data set is converted by the color converting process of FIG. 4, wherein FIG. 7(a)–FIG. 7(c) are explanatory diagrams showing how an example of input image data set is converted by a color converting process of a modification, wherein

DETAILED DESCRIPTION OF THE PREFERRED EMBODIMENT

A color-converting apparatus and a color-converting method according to a preferred embodiment of the present invention will be described while referring to th&e accompanying drawings wherein like parts and components are designated by the same reference numerals to avoid duplicating description.

Figure 3:
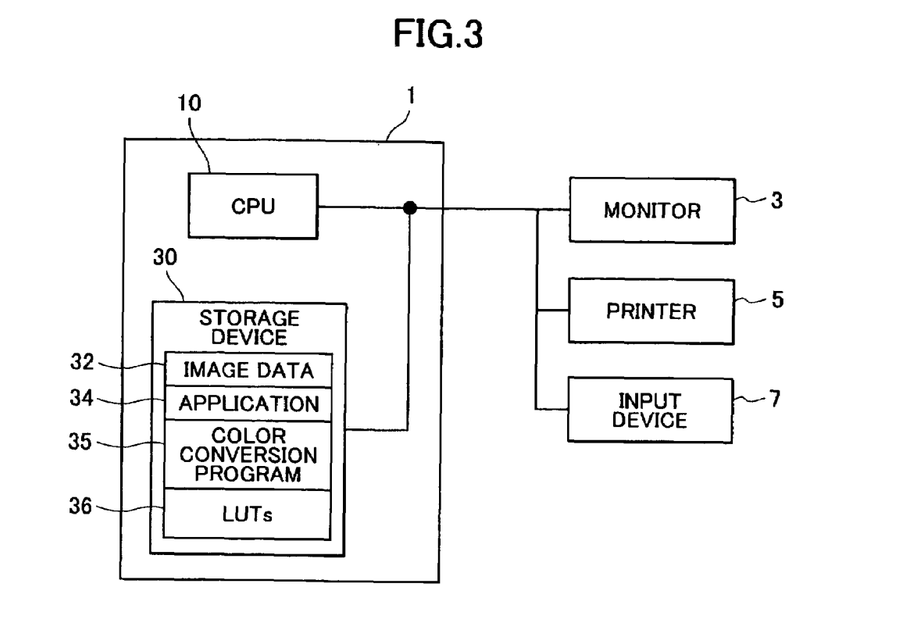
FIG. 3 is a block diagram showing the structure of a color-converting apparatus according to a preferred embodiment of the present invention.

First, the construction of the color-converting apparatus 1 of the present embodiment will be described with reference to FIG. 3.

The color-converting apparatus 1 is connected to external equipments, including a monitor 3, a printer 5, and an input device 7, such as a keyboard, mouse, and the like. In this example, the monitor 3 is an input-end device, while the printer 5 is an output-end device.

The color-converting apparatus 1 is internally provided with: a CPU 10 and a storage device 30 including a RAM and a hard disk. The CPU 10 and the storage device 30 are capable of performing data communications with each other.

The CPU 10 performs various processes. The CPU 10 is connected to and capable of performing data communications with the monitor 3, printer 5, and input device 7.

The storage device 30 includes an image data storage portion 32, an application storage portion 34, a color conversion program storage portion 35, and a lookup table storage portion 36 that are allocated therein. The image data storage portion 32 stores data for depicting images. The application storage portion 34 stores application programs that the CPU 10 reads for performing various operations. The color conversion program storage portion 35 stores a color conversion program (FIG. 4) that enables the CPU 10 to perform a color-converting process of the present embodiment to convert input image data for the monitor 3 into output image data for the printer 5.

The lookup table storage portion 36 stores data for lookup tables used by the color conversion program. The lookup tables include the lookup table LUTm expressing a color-converting property of the monitor 3 and a lockup table LUTp expressing a color-converting property of the printer 5.

It is noted that the LUTm is prepared beforehand as follows. The monitor 3 is controlled by plural RGB control signals (Rm, Gm, Bm), wherein Rm, Gm, and Bm are integers and satisfy the relationships of $0 \leq Rm \leq 255$, $0 \leq Gm \leq 255$, and $0 \leq Bm \leq 255$, and colors displayed on the basis of the respective RGB control signals (Rm, Gm, Bm) are measured to obtain Lab values (L*, a*, b*). The LUTm stores, as an input-side profile, the relationships between plural sets of (Rm, Gm, Em) and corresponding sets of (L*, a*, b*). The LUTp is prepared beforehand in a similar manner. That is, plural RGB control signals (Rp, Gp, Bp), wherein Rp, Gp, and Bp are integers and satisfy the relationships of $0 \leq Rp \leq 255$, $0 \leq Gp \leq 255$, and $0 \leq Bp\ 255$, are prepared. Then, plural CMY control signals (C, M, Y) are prepared by calculating the equations of $C=255-Rp$, $M=255-Gp$, and $Y=255-Bp$. The printer 5 is controlled by the plural CMY control signals (C, M, Y), and colors printed on the basis of the CMY control signals (C, M, Y) are measured to obtain Lab values (L*, a*, b*). The LUTp stores, as an output-side profile, the relationships between the plural sets of (Rp, Gp, Bp) and corresponding sets of (L*, a*, b*). The lookup tables LUTm and LUTp may be prepared in a manner described in U.S. Pat. No. 5,835,624, for example.

Figure 4:
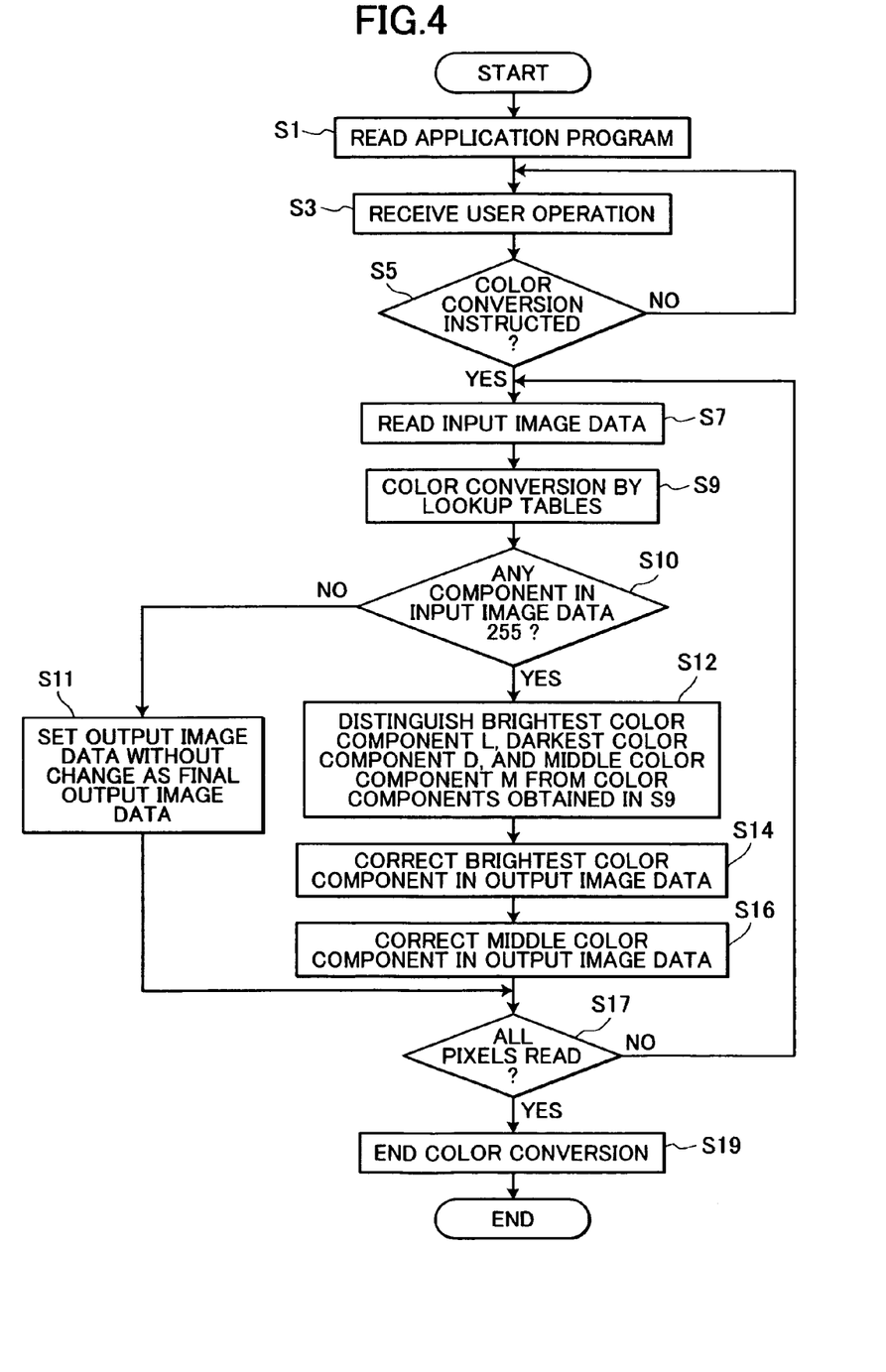
FIG. 4 is a flowchart showing a color converting process of the preferred embodiment executed by the color-converting apparatus of FIG. 3.

With the above-described structure, the color converting apparatus 1 executes a color-converting process by executing the color-converting program as shown in FIG. 4.

First, in S1, the CPU 10 reads an application program from the application storage portion 34, and executes various processes and controls according to this program. At the same time, the CPU 10 performs data communications with the monitor 3, the input device 7, and various storage areas in the storage device 30.

Next, in S3 the CPU 10 receives data indicating the result of operations performed by the user on the input device 7, and creates input image data and stores the input image data in the image data storage portion 32.

The input image data indicates an input image that is configured of pixels in a two-dimensional layout. Each pixel is configured of three color components defined as a red component Rm, a green component Gm, and a blue component Bm. Input image data for each pixel is defined as (Rm, Gm, Bm) and functions as color data for controlling the monitor 3. The CPU 10 transfers input image data (Rm, Gm, Bm) to the monitor 3 in order to display a desired image thereon. As described already, each color component Im (I=R, G, or B) has 256 gradations defined along an axis of the corresponding primary color (red, green, or blue) and represented in eight bits as 0 (predetermined minimum value)–255 (predetermined maximum value MAXm). As the gradation level increases from 0 to 255 along the corresponding axis, the lightness increases. Thus, 0 is the darkest level along the corresponding axis and 255 is the lightest or brightest level along the corresponding axis.

Next, in S5 the CPU 10 determines whether an instruction has been given to execute color conversion by monitoring operations performed by the user on the input device 7. If an instruction has been given to execute color conversion (S5: YES), then in S7 the CPU 10 reads a set of input image data (Rm, Gm, Em) for one pixel from the image data storage portion 32.

Next, in S9 the CPU 10 executes a lookup table color conversion process to convert the input image data set (Rm, Gm, Bm) into a set of output image data (Rp, Gp, Bp) using the lookup tables LUTm and LUTp stored in the lookup table storage portion 36.

It is noted that as with the input image data (Rm, Gm, Bm), the output image data indicates an output image that is also configured of pixels in a two-dimensional layout, with each pixel configured of the three color components red, green, and blue defined by (Rp, Gp, Bp). The output image data (Rp, Gp, Bp) functions as color data for controlling the printer 5. In other words, when the CPU 10 transfers the output image data (Rp, Gp, Bp) to the printer 5, the printer 5 can output a corresponding image. As described already, each color component Ip (I=R, G, or B) has 256 gradations defined along an axis of the corresponding primary color (red, green, or blue) and represented in eight bits as 0 (predetermined minimum value)–255 (predetermined maximum value MAXm). As the gradation level increases from 0 to 255 along the corresponding axis, the lightness increases. Thus, 0 is the darkest level along the corresponding axis and 255 is the lightest or brightest level along the corresponding axis.

The conversion process of S9 will be described in greater detail with reference to FIG. 5.

Figure 5:
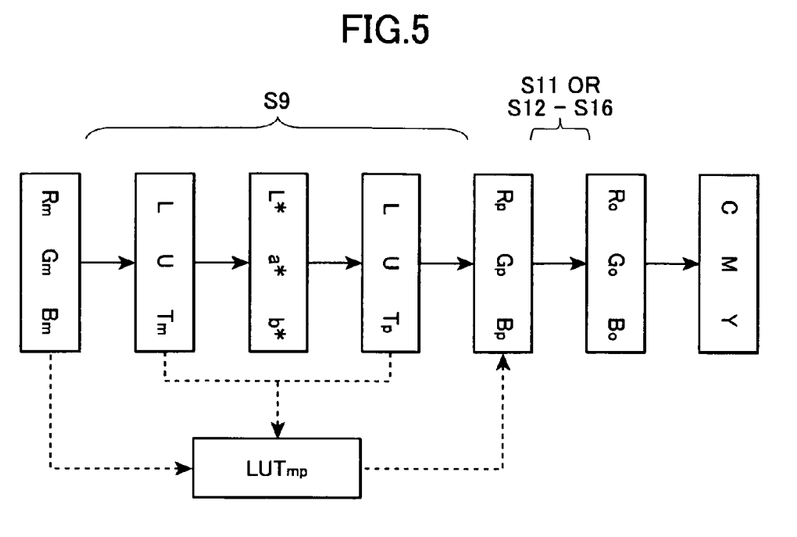
FIG. 5 is an explanatory diagram showing the steps in converting input image data into print data according to the preferred embodiment.

As shown in FIG. 5, the input image data set (Rm, Gm, Bm) is first converted into a set of Lab values (L*, a*, b*) defined in the L*a*b* color system using the lookup table LUTm. The Lab value set (L*, a*, b*) is further converted into the output image data set (Rp, Gp, Bp) using the lookup table LUTp.

It is noted that instead of the lookup tables LUTm and LUTp, a single lookup table LUTmp may be stored in the lookup table storage portion 36. As indicated by broken lines in FIG. 5, the lookup table LUTmp is created by combining the lookup tables LUTm and LUTp. By using this lookup table LUTmp, the input image data set (Rm, Gm, Bm) is converted directly to the output image data set (Rp, Gp, Bp) in S9.

Next, in S10 the CPU 10 determines whether the input image data set (Rm, Gm, Em) read in S7 includes the predetermined maximum gradation value Maxm (255) for the input end for any of the three color components. In S10, the CPU 10 also determines whether the values Rm, Gm, Bm in the input image data set (Rm, Gm, Bm) are different from one another.

If at least two of the values Rm, Gm, Bm are equal to one another or if none of the values Rm, Gm, Bm is equal to the maximum value Maxm (255) (S10: NO), the CPU 11 produces in S11 a set of final output image data (Ro, Go, Bo) as equal to the output image data set (Rp, Gp, Bp). Accordingly, in this case, the following relationship is satisfied: Ro=Rp, Go=Gp, and Bo=Bp. Then, the program proceeds to S17.

On the other hand, if the values Rm, Gm, Bm in the input image data set (Rm, Gm, Bm) are different from one another and one of the values Rm, Gm, Bm is equal to the maximum value Maxm (255) (S10: YES), then the program proceeds to S12.

In S12, the CPU 10 compares the three color components Rp, Gp, and Bp in the output image data set (Rp, Gp, Bp) that has been obtained in S9. The CPU 10 sets the largest (lightest or brightest) value among the values Rp, Gp, and Bp to L, the smallest (darkest) value to D, and the middle value to M. In this way, the CPU 10 determines which color component in the output image data has the highest (brightest) value, which has the middle value, and which has the lowest (darkest) value.

It is known that the color component of the output image data (Rp, Gp, Bp) that has the highest (brightest) value among the values Rp, Gp, and Bp and accordingly that is now set to L is most closely related to the color component of the input image data (Rm, Gm, Bm) that has the maximum value MAXm (255).

In S14, the CPU 10 corrects the highest (brightest) value L from among the Rp, Gp, and Bp to the predetermined maximum value MAX (255) for the output end.

In S16 the CPU 10 corrects the intermediate value M from among the Rp, Gp, and Bp to a value dependently on how the CPU 10 has corrected the highest (brightest) value L in S14. After completing the correction in S16 the CPU 10 advances to S17. It is noted that also in S16, the CPU 10 sets the smallest value D from among the Rp, Gp, and Bp as it is. Then, the program proceeds to S17.

In this way, during the processes of S12, S14, and S16, the output image data set (Rp, Gp, Bp) is corrected into the final output image data set (Ro, Go, Bo).

More specifically,

1) When Rp>Gp>Bp, then L is set to Rp, M to Gp, and D to Bp in S12. In S14 and S16, the CPU 10 sets Ro=MAX (255), Go=(MAX−D)*(M−D)/(L−D)+D, and Bo=D.

2) When Rp>Bp>Gp, then L is set to Rp, D to Gp, and M to Bp in S12. In S14 and S16, the CPU 10 sets Ro=MAX (255), Go=D, and Bo=(MAX−D)*(M−D)/(L−D)+D.

3) When Gp>Rp>Bp, then M is set to Rp, L to Gp, and D to Bp in S12. In S14 and S16, the CPU 10 sets Go=MAX (255), Ro=(MAX−D)*(M−D)/(L−D)+D, and Bo=D.

4) When Gp>Bp>Rp, then D is set to Rp, L to Gp, and M to Bp in S12. In S14 and S16, the CPU 10 sets Go=MAX (255), Bo=(MAX−D)*(M−D)/(L−D)+D, and Ro=D.

5) When Bp>Rp>Gp, then M is set to Rp, D to Gp, and L to Bp in S12. In S14 and S16, the CPU 10 sets Bo=MAX, (255), Ro=(MAX−D)*(M−D)/(L−D)+D, and Go=D.

6) When Bp>Gp>Rp, then D is set to Rp, M to Gp, and L to Bp in S12. In S14 and S16, the CPU 10 sets Bo=MAX, Go =(MAX−D))*(M−D)/(L−D)+D, and Ro=D.

In S17, the CPU 10 determines whether color conversion has been completed for all pixels in the input image data. If color conversion has been completed for all the pixels (S17: YES), then in S19 the color conversion process ends.

On the other hand, if that color conversion has not yet been completed for all the pixels in the input image data (S117: NO), then the process returns to S7 and executes color conversion on the next pixel.

On the other hand, if no indication has been given to perform color conversion in S5 (S5: NO), then the CPU 10 returns to S3 to accept other user operations.

Once the color conversion process is completed, the final output image data (Ro, Go, Bo) for all pixels is transferred to the printer 5, and the printer 5 outputs the corresponding image.

More specifically, the printer 5 determines a set of print data (C, M, Y) by calculating the following equations based on the final output image data (Ro, Go, Bo) for each pixel:

$$C=255-Ro,$$

$$M=255-Go,$$

and $$Y=255-Bo.$$

Using these equations, the printer 5 determines gradation levels of cyan, magenta, and yellow. The printer 5 then forms an image by outputting cyan, magenta, and yellow color material in amounts that are determined based on the print data (C, M, Y).

In this way, as shown in FIG. 5, the output image data set (Rp, Gp, Bp) is converted into the final output image data set (Ro, Go, Bo) in S11 or in the processes of S12–S16. Then, the final output image data set (Ro, Go, Bo) is converted into the print data set (C, M, Y).

When the gradation values for Rm, Gm, and Em of the input image data (Rm, Gm, Bm) are different from one another and one of these gradation values is equal to the maximum gradation value Maxm (255) for the input end (yes in S10), the processes of S12–S16 are executed to correct the output image data (Rp, Gp, Bp) into the final output image data (Ro, Go, Bo), thereby preventing an occurrence of the granularity and of hue deviations.

Figure 6A:
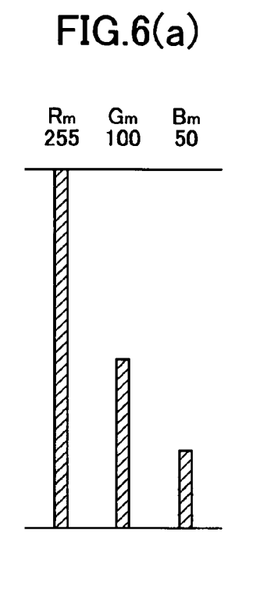
FIG. 6(a) is a graph showing the example of input image data (Rm, Gm, Bm)
Figure 6B:
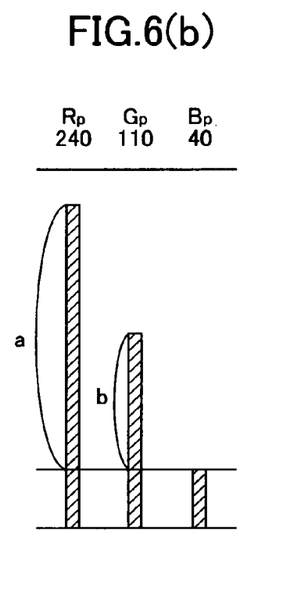
FIG. 6(b) is a graph showing an example of output image data (Rp, Gp, Bp)

Assume now that input image data (255, 100, 50) shown in FIG. 6(a) is read as a set of input image data (Rm, Gm, Bm) in S7, and that the color conversion of S9 by using the lookup tables LUTm and LUTp converts the input image data (255, 100, 50) into output image data (240, 110, 40), and sets the output image data (240, 110, 40) as output image data (Rp, Gp, Bp) as shown in FIG. 6(b).

In this example, the R, G, and B components 255, 100, and 50 in the input image data (255, 100, 50) are different from one another. The R component of the input image data (255, 100, 50) is equal to the maximum level Maxm (255) on the input end. Determination in S10 is therefore made affirmative.

In S12, L is set to 240, M to 110, and D to 40, as in case 1) described above.

Figure 6C:
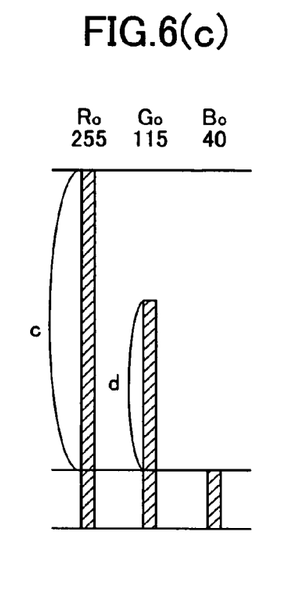
FIG. 6(c) is a graph showing an example of final output image data (Ro, Go, Bo)

In S14, the value L of 240 for the brightest color component Rp among the color components in the output image data (240, 110, 40) is replaced by the maximum value MAX (255) on the output end. Accordingly, the value Ro is determined to be 255 as shown in FIG. 6(c).

In S16, the value M of 110 for the intermediate color component Gp among the color components in the output image data (240, 110, 40) is corrected into the value "d+D" (=value Go), whose value d satisfies the following relationship:

$$a:b=c:d,$$

wherein a=L (Rp, in this case)−D (Bp, in this case), b=M (Gp, in this case)−D (Bp, in this case), and c=MAX (255)−D (Bp, in this case).

Accordingly, the value Go is determined to be 115 by first calculating the equation of Go=(255−40)×(110−40)/(240−40)+40=115.25 and then by rounding off the calculated result of 115.25 because gradation values should be integers.

The lowest value D, which is the color component Bp, in this example, is maintained as unchanged and is set to the value Bo. In other words, Bo=40.

In this way, the final output image data (Ro, Go, Bo) is set to (255, 115, 40) as shown in FIG. 6(c).

Since the R component Rp in the output image data (Rp, Gp, Bp) is originally 240, as shown in FIG. 6(b), the R component Rp should be reproduced using the complementary color component (cyan component C) with an amount of 15 (=255−240). However, the R component Rp is corrected into the value Ro of 255, as shown in FIG. 6(c), the complementary color C is eliminated since the complementary color component C has now a value of zero (0 =255−255). Accordingly, this process prevents the cyan component from becoming mixed with the red color. Granularity is prevented from occurring.

Additionally, the G component Go is corrected into the value Gp at a ratio corresponding to the ratio at which the R component Rp is corrected into the value Ro, thereby reducing variation in the hue.

Figure 6D:
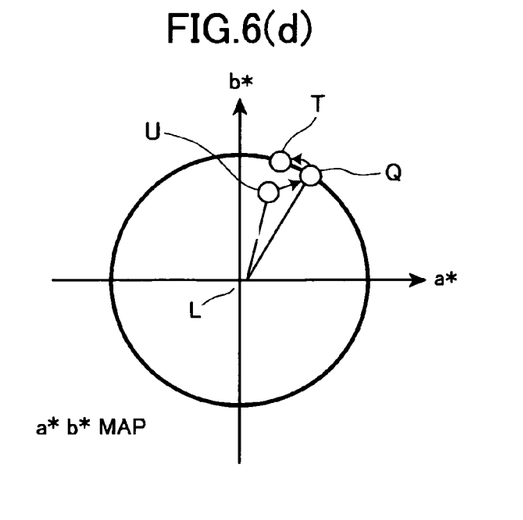
FIG. 6(d) is an explanatory diagram of an a*b* map showing the chroma and hue of a point U indicating the output image data of FIG. 6(b), a point T indicating the final output image data of FIG. 6(c), and a point Q indicating the output image data which is obtained in the middle of the processes for converting the point U (output image data of FIG. 6(b)) into the point T (final output image data of FIG. 6(c))

FIG. 6(d) shows the a*b* two-dimensional coordinate system. The input image data (255, 100, 50) (FIG. 6(a)) is converted through the process of 39 into the output image data (240, 110, 40) (FIG. 6(b)) indicated by point U. The output image data (240, 110, 40) indicated by point U is then corrected into image data (255, 110, 40) indicated by point Q through the process of S14. The image data (255, 110, 40) indicated by point Q is then corrected into image data (255, 115, 40) (FIG. 6(c)) indicated by point T through the process of S16.

As can be seen in the drawing, the pixel color is converted from point U to point Q by the correction of S14. During the process of S14, the value of the red component is increased. This increases the vividness, but greatly changes the hue. Then, the value of the green component is corrected in S16. This makes conversion from point Q to point T. Accordingly, the hue is returned to the state the same as the original state of point U, thereby reducing deviation in color hue.

In this way, the color-converting apparatus 1 prevents occurrence of granularity in an output image by setting the highest gradation value in the output image data (Rp, Gp, Bp) to the maximum value (255) to set the complementary color component to zero in the output results of the printer 5.

Moreover, deviation in color hue is reduced by correcting the middle gradation value in the output image data (Rp, Gp, Bp). That is, the proportions among the color component values making up the output image data (Rp, Gp, Bp) are adjusted in order to reduce variations in color hue.

As described above, according to the present embodiment, input image data (255, 100, 50) is first converted in S14 into output image data (240, 110, 40) based on the color conversion properties of the input end device and the output device, and is subsequently converted into final output image data (255, 115, 40) in S16. The conversion of S16 satisfies the relationship of (240−40): (110−40)=(255−40): (115−40). By changing the highest-gradation-level color in the output image data into the maximum gradation value (255), the complementary color component is made zero in the output results of the output device, thereby reducing granularity. Since the middle-gradation-level color is corrected, variations in color hue are reduced.

While the invention has been described in detail with reference to the specific embodiment thereof, it would be apparent to those skilled in the art that various changes and modifications may be made therein without departing from the spirit of the invention.

For example in the above-described embodiment, the color component corresponding to the middle value M in the output image data (Rp, Gp, Bp) is corrected into the value of (MAX−D)*(M−D)/(L−D)+D by using the smallest value D, the middle value M, the largest value L, and the predetermined maximum value MAX (255) on the output end. However, the color component corresponding to the middle value M in the output image data (Rp, Gp, Bp) can be corrected into the value of (MAX)*(M)/(L) by using the largest value L and the predetermined maximum value MAX (255) on the output end.

Figure 7A:
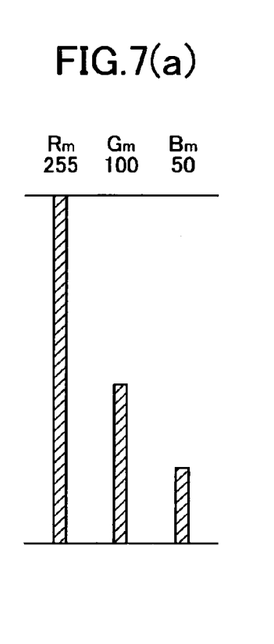
FIG. 7(a) is a graph showing the example of input image data (Rm, Gm, Bm)
Figure 7B:
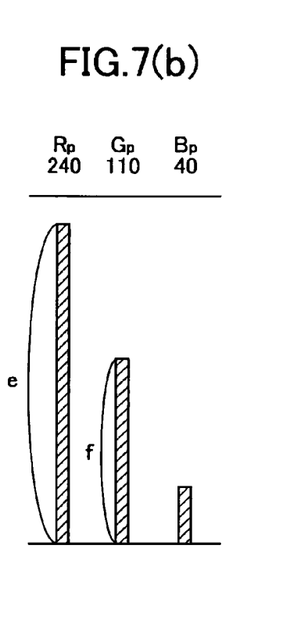
FIG. 7(b) is a graph showing an example of output image data (Rp, Gp, Bp)
Figure 7C:
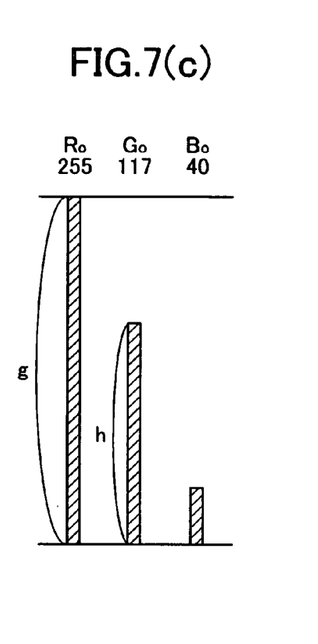
FIG. 7(c) is a graph showing an example of final output image data (Ro, Go, Bo).

It is now assumed that input image data (255, 100, 50), as shown in FIG. 7(a), is inputted in S7. The input image data (255, 100, 50) is converted in S9 to the output image data (240, 110, 40) as shown in FIG. 7(b). In S12, L is set to 240, M to 110, and D to 40. In S14, the value L of 240 for the brightest color component Rp is replaced by 255 as shown in FIG. 7(c). In S16, the middle value M of 110, which is the color component Gp, is corrected into the value h (Go) by calculating the equation of h (Go) =255×110/240=116.875 to satisfy the relationship of e:f=g:h in FIGS. 7(b) and 7(c), wherein e=L (Rp, in this example), f=M (Gp, in this example), and g=MAX (255). The resultant value 116.875 is rounded up into the value of Go=117. The lowest value D, which is the color component Bp, is set to the value Bo without change. Accordingly, Bo=40. As a result, the output image data (Rp, Gp, Bp)=(240, 110, 40) is converted into the final output image data (Ro, Go, Bo)=(255, 117, 40), as shown in FIG. 7(c). It is possible to prevent occurrence of granularity and to reduce deviation in color hue by setting the largest color component L in the output image data (Rp, Gp, Bp) to the maximum gradation value (255), by not changing the smallest color component D in the output image data (Rp, Gp, Bp), and by correcting the middle color component M in the output image data (Rp, Gp, Bp) into the value of (MAX)×(M)/(L)

In S14, the highest-gradation-level color component in the output image data (Rp, Gp, Bp) is determined as the color component that is most closely related to the color component in the input image data (Rm, Gm, and Bm) that has the predetermined maximum value MAXm (255) for the input end. Then, the value L of the highest-gradation-level color component is corrected into the maximum value MAX (255) for the output end. However, any other methods can be used in S14 to determine one color component in the output image data (Rp, Gp, Bp) that is most closely related to the color component in the input image data (Rm, Gm, and Sm) that has the predetermined maximum value MAXm (255) for the input end. It is noted that the input image data (Rm, Gm, Bm) is converted in S9 into the output image data (Rp, Gp, Bp) using the lookup tables LUTm and LUTp. The lookup tables LUTm and LUTp indicate that the red, green, and blue color components Rp, Gp, and Bp in the output image data (Rp, Gp, Bp) are most closely related to the color components Rm, Gm, and Bm in the input image data (Rm, Gm, Bm), respectively. In other words, the lookup tables LUTm and LUTp indicate that the values of the color components Rm, Gm, and Bm have the greatest effects on the values of the corresponding color components Rp, Gp, and Bp, respectively.

In the above-described embodiment, the input end device is the monitor 3, while the output end device is the printer 5. However, the input end device may be any image-defining devices other than the monitor 3, while the output end device may be any image-defining devices other than the printer 5. The lookup table storage portion 36 may be prestored with lookup tables expressing the color-conversion characteristics of the input end device and of the output end device.

In the above-described embodiment, the input image data is configured of red, green, and blue color components Rm, Gm, Eum. The output image data is configured of red, green, and blue color components Rp, Gp, Bp. However, the input image data may be configured of any other at least three color components a, b, c. The output image data may be configured of any other at least three color components A, B, C. The lookup tables for the input and output end devices are used to convert the input image data (a, b, c) into the output image data (A, B, C). When one of the color components a, b, c in the input image data is equal to the predetermined maximum, gradation value for the input end device (yes in S10), in S14, one of the color components A, B, and C that has the largest value among the values A, B, and C and therefore that is most closely related to the color component a, b, or c having the maximum gradation value is corrected into the maximum gradation value for the output end device. In S16, the middle value among the values A, B, and C is corrected. The at least one remaining value among the at least three values A, B, and C are set without change in the final output image data.

In the above-described embodiment, the printer 5 executes the conversion from the final output image data (Ro, Go, Bo) into the print data (C, M, Y). However, the color converting apparatus 1 may execute the conversion from the final output image data (Ro, Go, Bo) into the print data (C, M, Y).

What is claimed is:

1. A color-converting apparatus comprising:
   an inputting portion receiving input color data comprising input gradation levels for at least three input color components for an input end device;
   a color converting portion converting the input color data into output color data that comprises output gradation levels for at least three output color components for an output end device, the color converting portion executing the converting operation using conversion properties of the input end device and of the output end device;
   a determining portion determining whether one of the input gradation levels in the input color data is equal to a predetermined maximum input gradation level; and
   a correcting portion correcting the output color data into corrected output color data when the determining portion determines that one input gradation level in the input color data is equal to the predetermined maximum input gradation level, the corrected output color data comprising final output gradation levels for the at least three output color components,
   the correcting portion including:
      a maximum-gradation-level preserving portion correcting, into a predetermined maximum output gradation level, one output gradation level in the output color data for one output color component that corresponds to one input color component whose input gradation level is equal to the predetermined maximum input gradation level, thereby setting the predetermined maximum output gradation level as a final output gradation level for the subject output color component in the corrected output color data;
      an intermediate-gradation-level extracting portion extracting another output color component having an intermediate output gradation level that is intermediate among the output gradation levels in the output color data; and
      a hue preserving portion correcting the intermediate output gradation level based on correction characteristics of the maximum-gradation-level preserving portion, and setting the corrected intermediate output gradation level as a final output gradation level for the extracted output color component in the corrected output color data.

2. A color-converting apparatus according to claim 1, wherein the maximum-gradation-level preserving portion includes a highest-gradation-level extracting portion extracting an output color component having a highest output gradation level that is the highest among the output gradation levels in the output color data, the maximum-gradation-level preserving portion correcting the highest output gradation level into the predetermined maximum output gradation level, and setting the predetermined maximum output gradation level as the final output gradation level for the extracted output color component in the corrected output color data.

3. A color-converting apparatus according to claim 1, wherein the determining portion further determines whether the input gradation levels in the input color data are different from one another, and
   wherein the correcting portion corrects the output color data into the corrected output color data when the determining portion determines that one input gradation level in the input color data is equal to the predetermined maximum input gradation level and that the input gradation levels in the input color data are different from one another.

4. A color-converting apparatus according to claim 1, wherein the correction portion further includes a lowest-gradation-level extracting portion extracting another output color component having a lowest output gradation level that is the lowest among the output gradation levels in the output color data, and setting the lowest output gradation level without change as the final output gradation level for the extracted output color component in the corrected output color data.

5. A color-converting apparatus according to claim 1, wherein the hue preserving portion corrects the intermediate output gradation level by a correction ratio corresponding to a ratio, at which the maximum-gradation-level preserving portion corrects the highest output gradation level into the predetermined maximum output gradation level.

6. A color-converting apparatus according to claim 5, wherein the hue preserving portion corrects the intermediate output gradation level according to an equation of $(MAX)*(M)/(L)$, wherein L indicates the highest output gradation level, M indicates the intermediate output gradation level, and MAX indicates the predetermined maximum output gradation level.

7. A color-converting apparatus according to claim 5, wherein the hue preserving portion corrects the intermediate output gradation level according to an equation of $(MAX-D)*(M-D)/(L-D)+D$, wherein L indicates the highest output gradation level, M indicates the intermediate output gradation level, D indicates the lowest output gradation level, and MAX indicates the predetermined maximum output gradation level.

8. A color-converting apparatus according to claim 1, further comprising a complementary color-data determining portion receiving the corrected output color data from the correcting portion and converting the corrected output color data into complementary color data, the complementary color data comprising complementary gradation levels for at least three output complementary-color components for the output end device, the complementary gradation levels being equivalent to differences between the predetermined maximum output gradation level and the final output gradation levels in the corrected color data.

9. A color-converting method comprising:
receiving input color data comprising input gradation levels for at least three input color components for an input end device;
converting the input color data into output color data that comprises output gradation levels for at least three output color components for an output end device, the color converting step executing the converting operation using conversion properties of the input end device and of the output end device;
determining whether one of the input gradation levels in the input color data is equal to a predetermined maximum input gradation level; and
correcting the output color data into corrected output color data when the determining step determines that one input gradation level in the input color data is equal to the predetermined maximum input gradation level, the corrected output color data comprising final output gradation levels for the at least three output color components,
the correcting step including:
preserving a maximum-gradation-state of the input color data by correcting, into a predetermined maximum output gradation level, one output gradation level in the output color data for one output color component that corresponds to one input color component whose input gradation level is equal to the predetermined maximum input gradation level, and by setting the predetermined maximum output gradation level as a final output gradation level for the subject output color component in the corrected output color data;
extracting another output color component having an intermediate output gradation level that is intermediate among the output gradation levels in the output color data; and
preserving hue of the input color data by correcting the intermediate output gradation level based on correction characteristics of the maximum-gradation-state preserving step and by setting the corrected intermediate output gradation level as a final output gradation level for the extracted output color component in the corrected output color data.

10. A color-converting method according to claim 9, wherein the maximum-gradation-state preserving step includes a highest-gradation-level extracting step extracting an output color component having a highest output gradation level that is the highest among the output gradation levels in the output color data, the maximum-gradation-state preserving step correcting the highest output gradation level into the predetermined maximum output gradation level, and setting the predetermined maximum output gradation level as the final output gradation level for the extracted output color component in the corrected output color data.

11. A color-converting method according to claim 9, wherein the determining step further determines whether the input gradation levels in the input color data are different from one another, and
wherein the correcting step corrects the output color data into the corrected output color data when the determining step determines that one input gradation level in the input color data is equal to the predetermined maximum input gradation level and that the input gradation levels in the input color data are different from one another.

12. A color-converting method according to claim 9, wherein the correction step further includes a lowest-gradation-level extracting step extracting another output color component having a lowest output gradation level that is the lowest among the output gradation levels in the output color data, and setting the lowest output gradation level without change as the final output gradation level for the extracted output color component in the corrected output color data.

13. A color-converting method according to claim 9, wherein the hue preserving step corrects the intermediate output gradation level by a correction ratio corresponding to a ratio, at which the maximum-gradation-state preserving step corrects the highest output gradation level into the predetermined maximum output gradation level.

14. A color-converting method according to claim 13, wherein the hue preserving step corrects the intermediate output gradation level according to an equation of $(MAX)*(M)/(L)$, wherein L indicates the highest output gradation level, M indicates the intermediate output gradation level, and MAX indicates the predetermined maximum output gradation level.

15. A color-converting method according to claim 13, wherein the hue preserving step corrects the intermediate output gradation level according to an equation of $(MAX-D)*(M-D)/(L-D)+D$, wherein L indicates the highest output gradation level, M indicates the intermediate output gradation level, D indicates the lowest output gradation level, and MAX indicates the predetermined maximum output gradation level.

16. A color-converting method according to claim 9, further comprising a complementary color-data determining step receiving the corrected output color data from the correcting step and converting the corrected output color data into complementary color data, the complementary color data comprising complementary gradation levels for at least three output complementary-color components for the output end device, the complementary gradation levels being equivalent to differences between the predetermined maximum output gradation level and the final output gradation levels in the corrected color data.

* * * * *